US007688014B2

(12) United States Patent
Tang et al.

(10) Patent No.: US 7,688,014 B2
(45) Date of Patent: Mar. 30, 2010

(54) SYSTEM AND METHOD FOR A MOVEABLE BARRIER OPERATOR

(76) Inventors: Ping Hung Tang, Rm 03, 13/F Block B, Veristrong Industrial Centre, 34-36 Aupuiwan Street, Fotan (HK); Gallen Ka Leung Tsui, 17 Sheard Avenue, Brampton, Ontario (CA) L6Y 1J3; Philip Y. W. Tsui, 17 Sheard Avenue, Brampton, Ontario (CA) L6Y 1J3

( * ) Notice: Subject to any disclaimer, the term of this patent is extended or adjusted under 35 U.S.C. 154(b) by 372 days.

(21) Appl. No.: 11/784,890

(22) Filed: Apr. 10, 2007

(65) Prior Publication Data

US 2007/0247096 A1 Oct. 25, 2007

Related U.S. Application Data

(60) Provisional application No. 60/790,872, filed on Apr. 10, 2006.

(51) Int. Cl.
*H02P 3/00* (2006.01)

(52) U.S. Cl. ....................... 318/466; 318/266; 318/282; 340/52; 340/825.77

(58) Field of Classification Search ................. 318/266, 318/282, 285, 466, 468; 340/5, 71, 5.52, 340/825.77
See application file for complete search history.

(56) References Cited

U.S. PATENT DOCUMENTS

| | | | | | |
|---|---|---|---|---|---|
| 4,367,470 | A * | 1/1983 | Tadokoro et al. | ....... | 340/825.77 |
| 6,356,048 | B1 * | 3/2002 | Zenoni et al. | ............... | 318/806 |
| 6,388,399 | B1 * | 5/2002 | Eckel et al. | ................. | 315/312 |
| 6,563,278 | B2 * | 5/2003 | Roman | ........................ | 318/282 |
| 7,106,168 | B2 * | 9/2006 | McMahon | ................. | 340/5.61 |
| 7,342,368 | B2 * | 3/2008 | Roman | ........................ | 318/285 |
| 2001/0013762 | A1 * | 8/2001 | Roman | ........................ | 318/282 |
| 2003/0071590 | A1 * | 4/2003 | Roman | ........................ | 318/282 |
| 2005/0151622 | A1 * | 7/2005 | McMahon | ................. | 340/5.61 |
| 2006/0012325 | A1 * | 1/2006 | Robb et al. | ................. | 318/466 |
| 2007/0013477 | A1 * | 1/2007 | Fitzgibbon et al. | ......... | 340/5.52 |
| 2007/0063815 | A1 * | 3/2007 | Tsui et al. | .................. | 340/5.71 |

* cited by examiner

*Primary Examiner*—Paul Ip
(74) *Attorney, Agent, or Firm*—Crowell & Moring LLP

(57) ABSTRACT

A communication protocol is employed between a movable barrier operator and an associated wall button using the traditional signaling wires connecting them. Implementing the communication protocol using the existing signaling wires also allows backward compatibility with the traditional push wall buttons that have a physical contact switch. In one embodiment, the communication protocol allows bi-directional communication between the moveable barrier operator and the wall button. The bi-directional embodiment of the protocol allows further communications, such as handshaking, signal confirmation and more advanced control between the wall unit and the barrier operator.

30 Claims, 11 Drawing Sheets

PWM REPRESENTATION

| DIGIT | PULSE WIDTH (ms) |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 0 | 10 |

DTMF FREQUENCIES

| DIGIT | LOW FREQUENCY (Hz) | HIGH FREQUENCY (Hz) |
|---|---|---|
| 1 | 697 | 1209 |
| 2 | 697 | 1336 |
| 3 | 697 | 1477 |
| 4 | 770 | 1209 |
| 5 | 770 | 1336 |
| 6 | 770 | 1477 |
| 7 | 852 | 1209 |
| 8 | 852 | 1336 |
| 9 | 852 | 1477 |
| 0 | 941 | 1336 |
| * | 941 | 1209 |
| # | 941 | 1477 |
| A | 697 | 1633 |
| B | 770 | 1633 |
| C | 852 | 1633 |
| D | 941 | 1633 |

SYSTEM AND METHOD FOR A MOVEABLE BARRIER OPERATOR

CROSS-REFERENCE TO RELATED APPLICATION

This application claims the benefit of U.S. Provisional Application No. 60/790,872, filed Apr. 10, 2006.

FIELD OF THE INVENTION

The invention relates in general to systems and methods for controlling the operation of a barrier. In particular, the invention relates to a moveable barrier operator that employs a more robust communication protocol.

BACKGROUND

Moveable barrier operators, such as garage door openers or swing gate openers, provide the convenience of automatically opening and closing a barrier so that users do not have to manually open or close the barrier. Due to the popularity of such moveable barrier operators, many of them, such as garage door openers ("GDOs") can be purchased from home hardware stores. Many of them have been designed to be installed by the end user as a "do-it-yourself" system.

Most installations of moveable barrier operators involve hardware installation, such as mounting the operator, rail, safety infrared sensor, etc. After installing the hardware, programming is typically also required. Programming may include setting the upper travel limit, lower travel limit, the force required to open/close the door, as well as to program additional remotes to the barrier operator. While some of these programming steps need to be performed only once during installation, there are others that must be performed more than once (e.g., programming additional remote controls).

In addition, most of the aforementioned programming steps are done on the barrier operator itself, which means the user will have to climb up a ladder to access the barrier operator in order to change the program settings or even to program additional remotes. For this reason, some barrier operators have been designed to that allow users to perform limited programming using a wall button that is used to activate the barrier operator. However, these wall buttons employ only very simple hardware that provides a single directional signal to the barrier operator, and is capable of providing only one or two programming commands. Unfortunately this is insufficient for more sophisticated barrier operators that have numerous programming options.

More expensive systems may include more accessories such as more remote controls, or different drive systems such as chain drive or more expensive option, belt drive. The circuit boards for all systems are similar, all of the software related features are built-in to the microprocessor on the barrier operator. It is not possible to add software related features to an existing barrier operator. If user would like to have feature that is not already built-in to the operator, that additional feature will have to be a standalone add-on item, also known as an aftermarket product. As such, there is a need for a system and method that accommodates more sophisticated barrier operators, while also simplifying the installation process.

SUMMARY OF THE INVENTION

Disclosed are barrier operators, wall button units and methods for operating a moveable barrier operator. In one embodiment, a barrier operator system includes a barrier operator including a motor drive unit configured to open and close a barrier, the barrier operator further includes a barrier operator processor for encoding barrier information in accordance with a communication protocol. In one embodiment, the barrier operator system further includes a wall button unit having a wall button processor, a first wire electrically connecting the wall button unit to the barrier operator, where the first wire is to provide the barrier information to the wall button processor, and wherein the first wire is further to supply a predetermined direct current (DC) voltage from the barrier operator to the wall button unit. The barrier operator system further includes a second wire to provide a returning current such that the first and second wires form a completed electrical circuit for powering the wall button unit.

Other aspects, features, and techniques of the invention will be apparent to one skilled in the relevant art in view of the following description of the exemplary embodiments of the invention

DETAILED DESCRIPTION OF THE EXEMPLARY EMBODIMENTS

One aspect of the invention is a communication protocol is employed between a movable barrier operator and an associated wall button using the traditional signaling wires connecting them. In one embodiment, no additional wiring is needed. The communication protocol according to the invention may be implemented using the existing traditional signaling wires that are used by the barrier operator to send signals to the wall button, and vice versa. Implementing the communication protocol using the existing signaling wires also allows backward compatibility with the traditional push wall buttons that have a physical contact switch. In one embodiment, the communication protocol allows bi-directional communication between the moveable barrier operator and the wall button. The bi-directional embodiment of the protocol allows further communications, such as handshaking, signal confirmation and more advanced control between the wall unit and the barrier operator. It should be appreciated that the communication protocol may be open-source or proprietary.

Another aspect of the invention is a modular system that can be used to add additional features to an existing moveable barrier operator. Using a communication protocol over the signaling wires in accordance with the invention, multiple modules can be added by parallel connection. Instead of performing only traditional functions, such as opening and closing the barrier, more advanced features can be performed depending on the function of the additional module. A variety of modules may be used to customize the moveable barrier operator for the user's specific needs.

Figure 1:
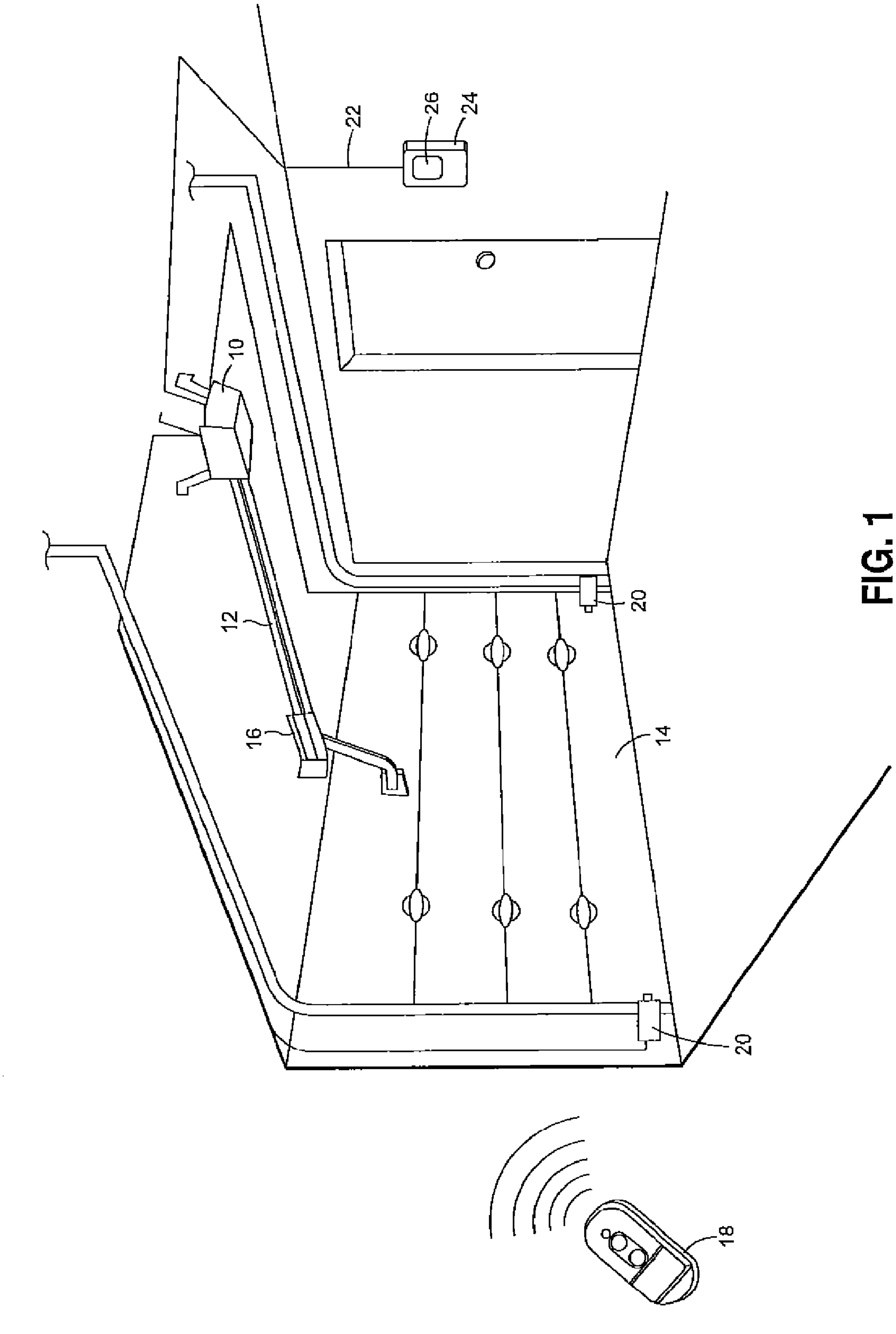
FIG. 1 (PRIOR ART)
FIG. 1 is a general schematic diagram a typical barrier control system.

Still another aspect of the invention is to provide a dimming feature that serves as an early indication of when a light associated with the barrier operator will turn off. Namely, when the light is about to be off, the light will start to dim slowly thereby indicating that it will turn off soon (e.g., within the next 20 seconds, for example). In one embodiment, the rate of dimming is such that the user will have enough time to decide if they want to keep the lights on or not by, for example, activating a light switch on the wall button. Additional wall mounted lighting modules can also be added to dim or brighten the light of the garage door opener manually, similar to conventional dimmers for home lighting Referring now to FIG. 1, depicted is one embodiment of a typical garage door operator positioned within a garage. The GDO includes a head unit 10 mounted to the ceiling of a garage. The head unit 10 includes a electric motor (not shown) that is connected to a rail assembly 12. The head unit 10 is able to open and close the garage door 14 using a trolley 16, which moves along the rail assembly 12. The head unit 10 includes a radio receiver (not shown) for receiving signals from remote transmitter 18. Multiple transmitters can be used to operate the head unit 10. A pair of safety infrared sensors 20 are also installed on either side of the garage door 14, as shown in FIG. 1. When the infrared signal between the two sensors 20 is blocked or other otherwise interrupted in the process of the door 14 being closed, the sensors 20 will signal to the head unit 10 to reverse the direction of the door's 14 movement.

A pair of signaling wires 22 are used to electrically connect to the head unit 10 to a wall button 24. When the switch 26 of the wall button 24 is depressed, the head unit 10 will be actuated causing the door 14 to either open or close, depending on its current position.

Figure 2:
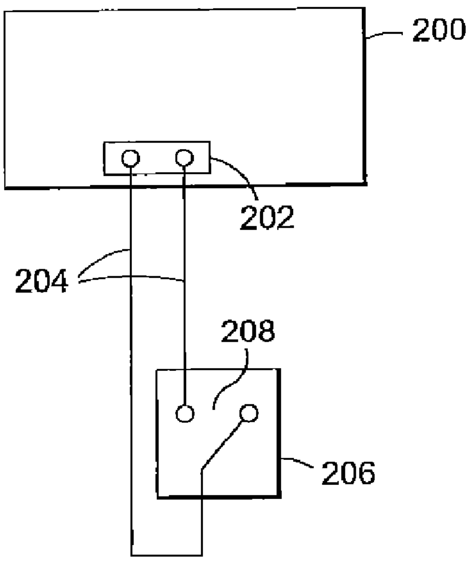
FIG. 2 (PRIOR ART)
FIG. 2 is a simplified schematic diagram of the typical connection between a barrier operator and a wall button.

FIG. 2 shows a typical wall button 202 connecting to a garage door opener 200 via signaling wires 204. In particular, the wall button 202 consists of a contact switch 206 which is in open circuit connection while the wall button 202 is not being pressed. The signaling wires 204 are connected to this switch 206 and therefore provide a normally open (NO) signal from the wall button 202 to the garage door opener 200. When the wall button signal is closed, meaning the switch on the wall button is pressed, the garage door opener 200 will be activated.

Traditional signaling wires between the garage door operator and wall button are not designed for signal transmission. The signaling wires normally carry a DC voltage at approximately 24V (some are at 12V DC), which is enough to send a simple activation signal and enough to maintain the operation of a simple circuitry within the wall button, such as keeping the light-emitting-diode (LED) on. In this fashion, the signaling wires act as the power supply for the wall button. When the wall button is pressed, the voltage level will be dropped to 0 volts and a command is sent to activate the associated garage door operator. When the wall button is released, the voltage returns to 24 volts. However, this voltage is not sufficient for signaling purpose. Thus, one aspect of the invention is to provide a protocol for signal transmission while continuing to supply enough DC power for the wall button. In one embodiment, a data signal is superimposed onto the existing DC voltage level. In another embodiment, said data signal is a Dual-Tone Multi-Frequency (DTMF) signal or Pulse-Width Modulated signal.

In order to transmit a signal from one device to another through the signaling wires, the side that sends the signal (transmitter) must have a code generator to generate a signal containing the encoded data. Typically, a microprocessor is used to generate the encoded signal, which is a pulse signal consisting of multiple bits representing a data message. The total number of bits depends on the complexity of the message. The higher the number of bits, the higher the number of possible messages that can be represented. A typical message may consist of anywhere from 16 bits to 64 bits, and having varying bit patterns. The simplest bit patterns consist of bit "0" and bit "1". Depending on the coding, multiple bits can be used to represent different messages. For instance, a 4-bit code can have up to 16 different messages. A sync bit is usually placed at the beginning of the signal in order to "wake up" the receiver, or otherwise alert the receiver that there is an incoming signal. The timing of the sync bit is usually very different from other bit patterns so as to distinguish the sync bit from other bit patterns. The message can also be encrypted to enhance security. If the message is encrypted, the receiver side must have a corresponding decryption algorithm. Other encoding techniques include Pulse-Width Modulation (PWM), and Dual-Tone Multi-Frequency (DTMF). Signals generated by these two encoding techniques are classified as analog signals. Pulse-Width Modulation generates pulses with various duty cycles or various widths. The widths of the pulses correspond to specific data values that are not limited to binary signals.

Figure 3A:
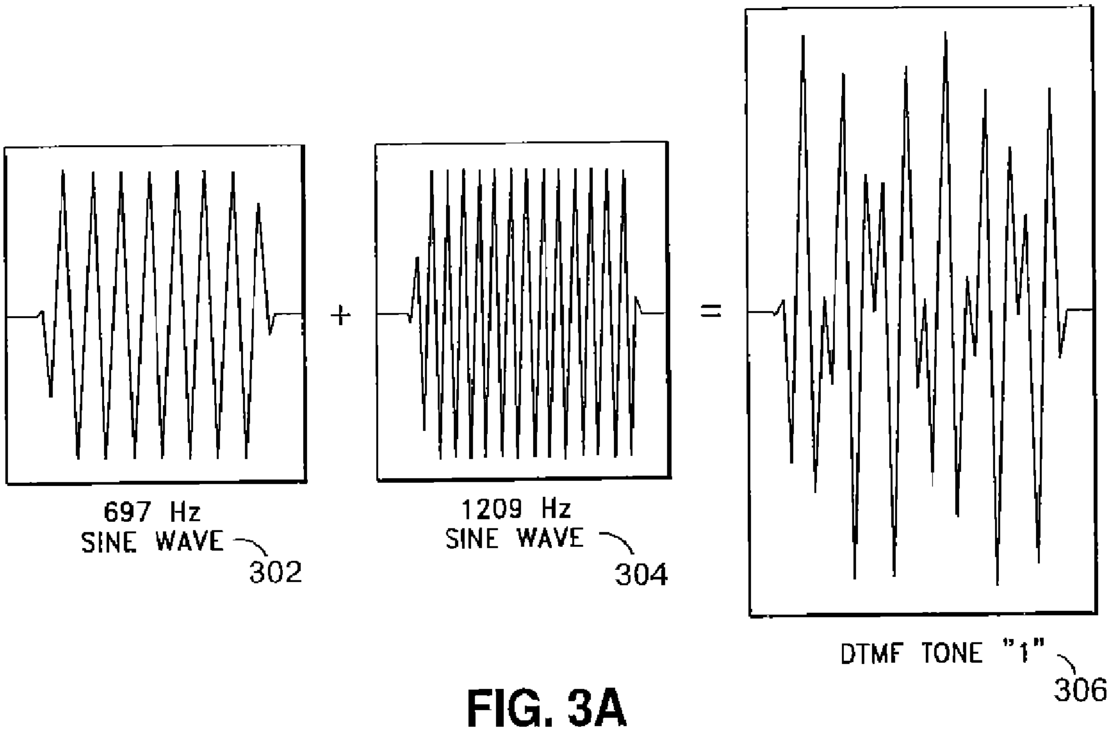
FIG. 3A depicts sine wave signals for typical DTMF signal patterns sent between a barrier operator and an associated wall button.
Figures 3B, 3C:
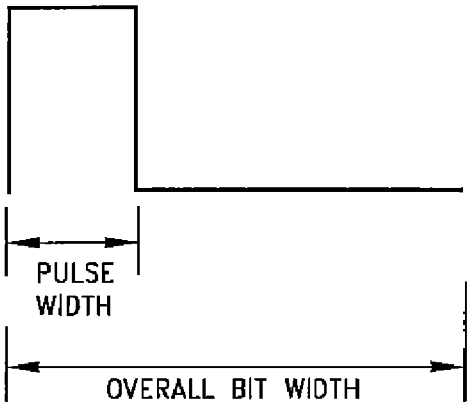
FIG. 3B is a table of different pulse durations for different Pulse-Width Modulated (PWM) signals.
FIG. 3C is a table illustrating different frequencies for different DTMF tone signals.

To that end, FIG. 3A illustrates how different pulse widths of a data bit can represent different numeric digits. One data bit can therefore represent multiple values. Therefore, PWM offers wider selections for coding combinations than binary coding while having the fixed number of bits. DTMF is an example of multiple-frequency encoding signal, which is commonly used in today's telephone systems, also known as Touch Tone phones. A sine wave of 697 Hz is shown as sine wave 302. By adding another sine wave 304 having a frequency of 1209 Hz, a resulting sine wave 306 may be generated as a DTMF signal representing digit "1". Each DTMF digit consists of a sinusoidal tone of two frequencies, as shown in FIG. 3B. Each numeric digit from 0 to 9 and A, B, C, D, "*" and "#" has a pre-assigned low frequency and a high frequency, as shown in FIG. 3C. Therefore, one DTMF tone represents a numeric number or letter or symbol. Similar to PWM, DTMF signals are not limited to binary signal, such as "0" and "1". One data bit of a DTMF signal can represent up to 16 signals (0 to 9 and A, B, C, D, "*") and "#"). Therefore, one advantage of having PWM and DTMF encoding over traditional binary digital encoding is the reduction in the number of digits required in a given signal, and therefore a shorter duration of data signal transmission.

Figure 4A:
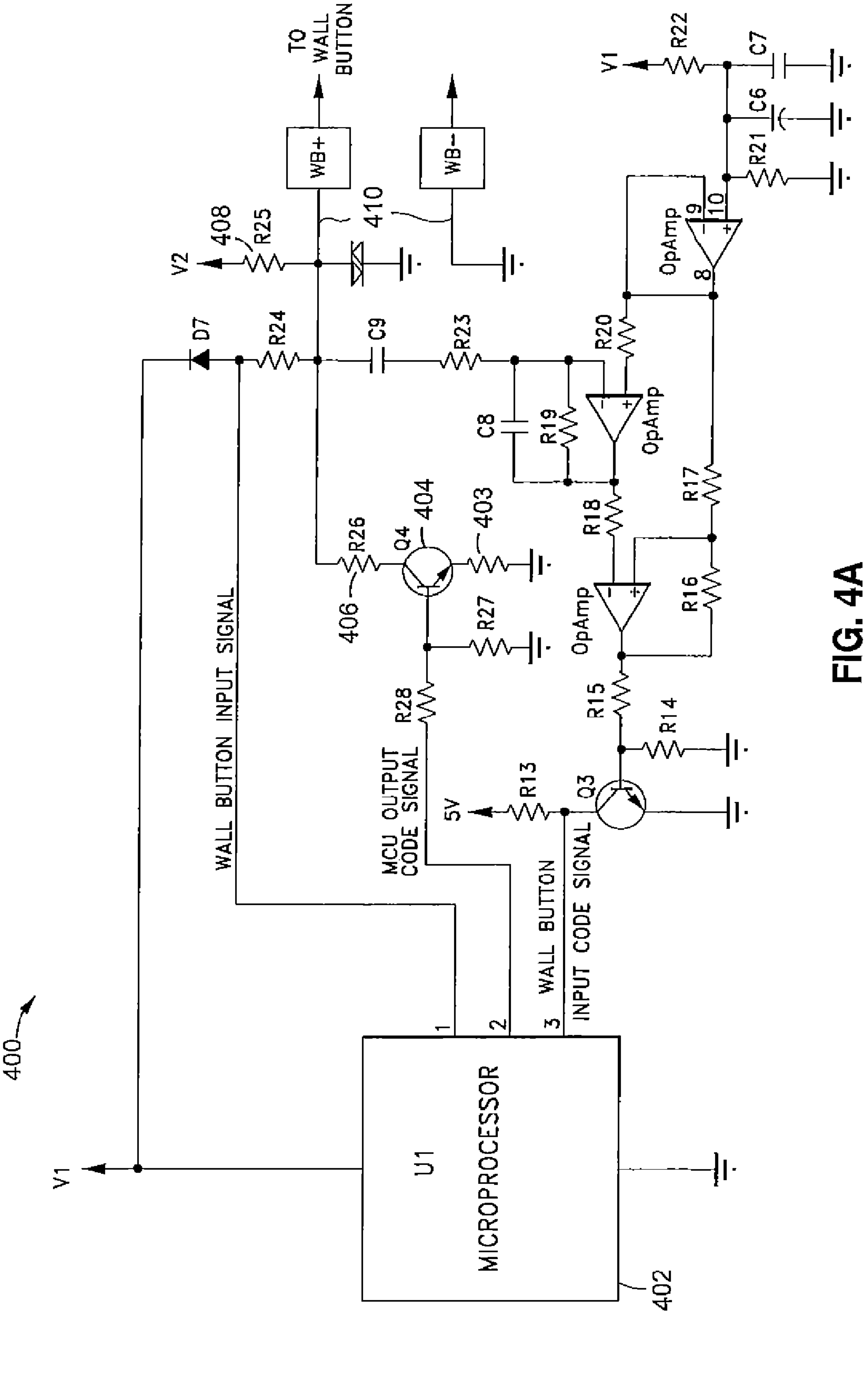
FIG. 4A is a schematic diagram of a barrier operator configured in accordance with one embodiment of the invention.

Referring now to FIG. 4A, depicted is a schematic diagram of a garage door operator 400 capable of implementing a signaling protocol using the signaling wires between the garage door operator 400 and a corresponding wall button (not shown). To initiate a signal transmission process, an encoded signal is generated by a microprocessor 402 at a transmitter side, which in this case is the garage door operator 400. Having an amplitude of approximately 5V (depends on the operating voltage of the microprocessor), this signal may be sent out on the signaling wires through a converter, which includes a transistor 404 and resistors 403, 406 and 408, as shown in FIG. 4A. In one embodiment, the resulting encoded signal will have a peak-to-peak voltage of approximately 1 volt. The encoded signal may consist of a superimposed binary data, or a PWM data or a DTMF data. It should be appreciated that the ratio between resistors 403, 406, and 408 may affect the resulting amplitude of the encoded signal. The encoded signal may then travel through the signaling wires 410 to the receiver side, which in this embodiment is the associated wall button. It may be desirable to keep the amplitude of the resulting signal to 1 volt in order to maintain the voltage level, and ensure the DC power over the signaling wires will not fluctuate significantly. As mentioned, the signaling wires 410 may also act as power supply wires for the wall button. Therefore, it may be desirable to maintain a stable power supply to the wall button.

Figure 4B:
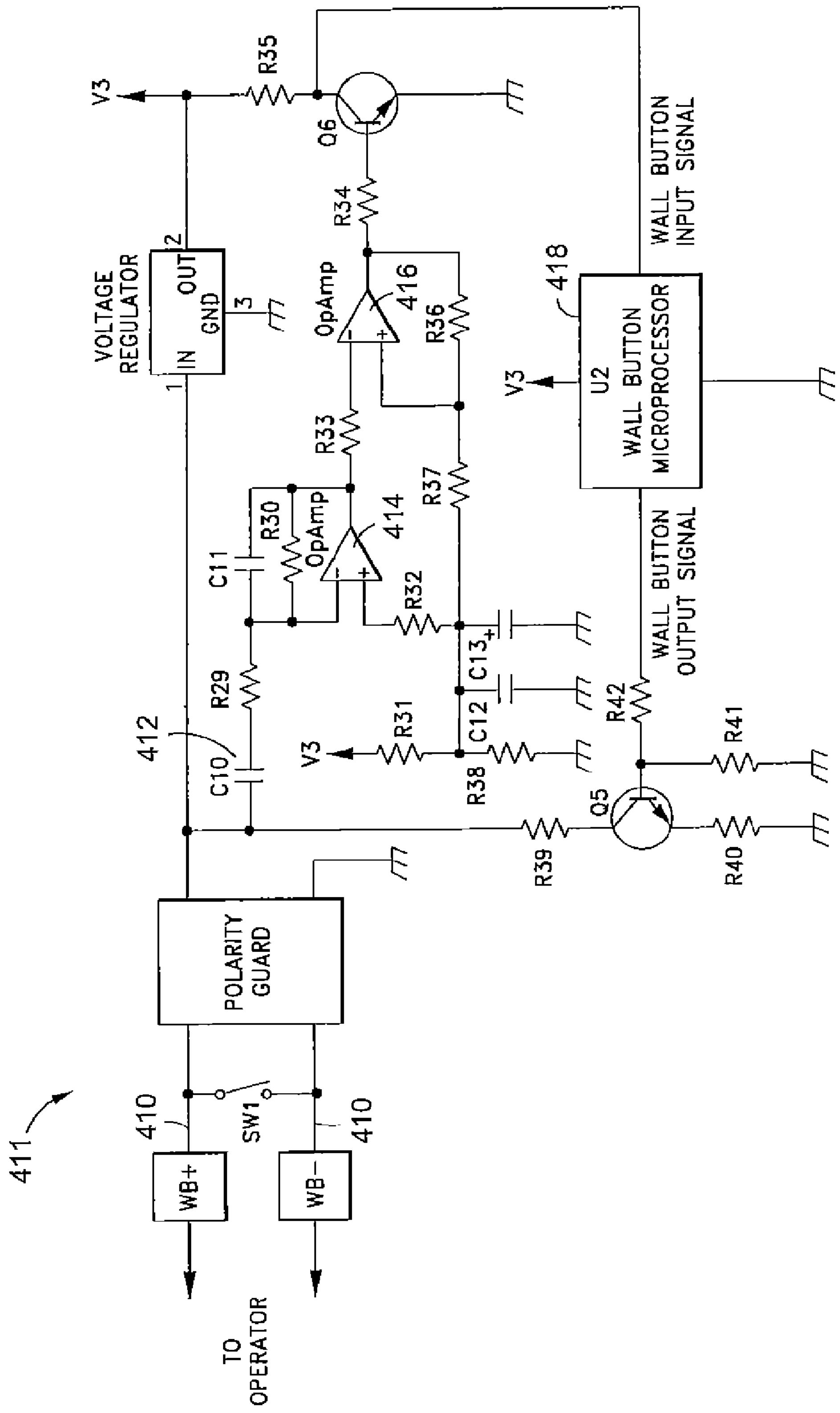
FIG. 4B is a schematic diagram of a wall button configured in accordance with one embodiment of the invention.

FIG. 4B shows a schematic diagram of a wall button 411 in accordance with the principles of the invention. In order to receive and decode the encoded signal received over signaling wires 410, the receiver (i.e., wall button 411) must have a signal processor to retrieve the encoded signal from the DC voltage. In one embodiment, this may be done using a capacitor 412. In addition, since the amplitude of the retrieved signal is relatively small (i.e., approximately 1 volt), an amplifier may be needed to amplify the signal. To that end, an operational amplifier 414 may be used to amplify the retrieved signal to approximately 10 times that of the original amplitude. This amplified signal may then be converted to a pulse signal by another operational amplifier 416 having an amplitude that is suitable for the microprocessor 418 to decode.

Both the wall button and garage door operator are capable of transmitting and receiving signals using a converter that encodes the signal onto the signaling wires DC voltage level, and a signal processor for decoding a received signal. As such, the communication protocol may be bi-directional. By using the existing signaling wires and voltage, the function of the wall button's NO contact switch is unaffected. As such, either a traditional contact switch or a more advanced wall switch (e.g., wall switch 411) may be connected to the signaling wires used to implement the communication protocol of the invention.

Figure 5:
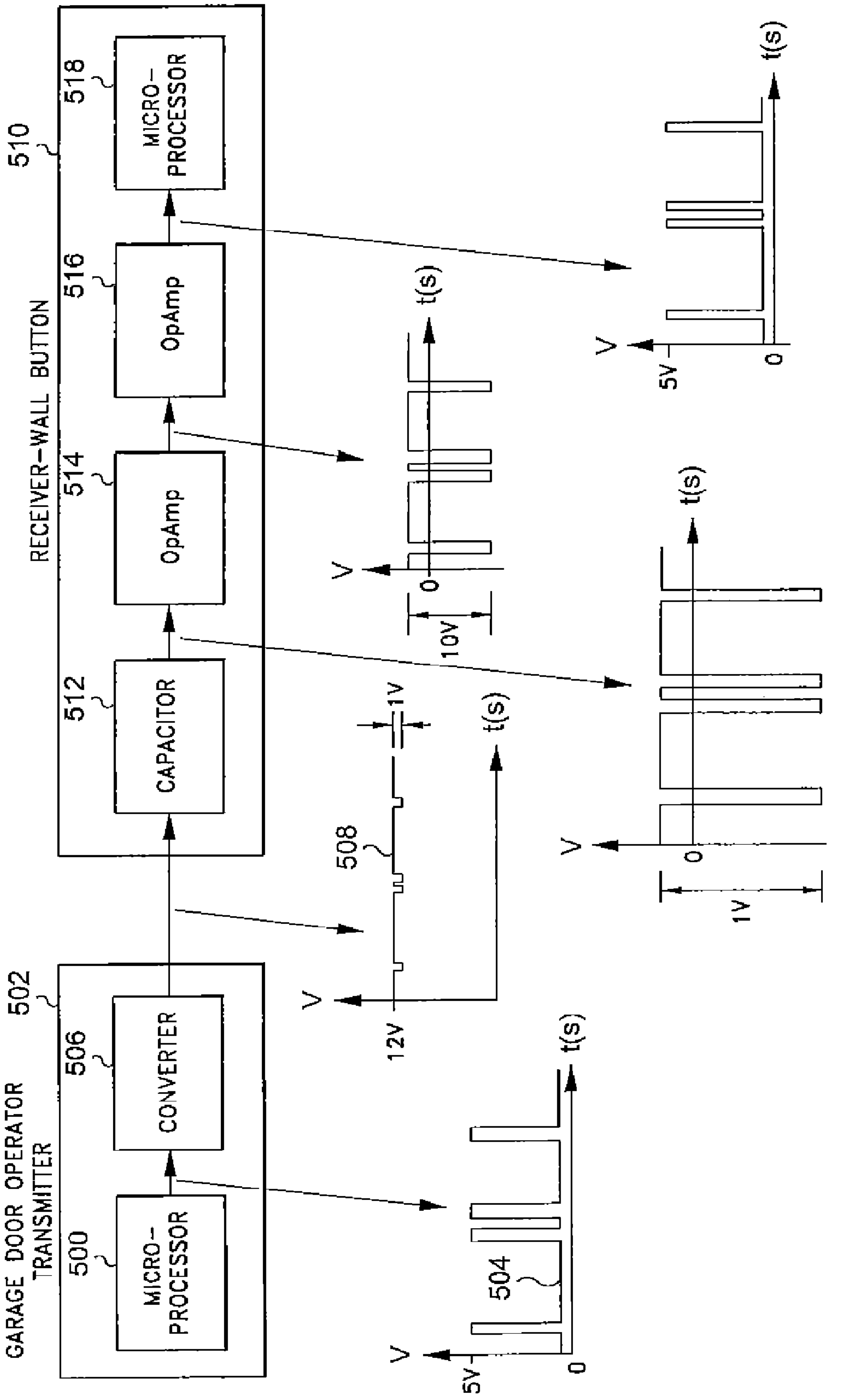
FIG. 5 is a diagram of one embodiment of a system for implementing one or more aspects of the invention.

Referring now to FIG. 5, depicted is one embodiment of how the communication protocol of the invention may be implemented. In particular, the various formats of a signal being sent from a garage door operator 502 to a wall button 510 are depicted. Microprocessor 500 in the garage door operator 502 generates a pulse signal 504 having an amplitude of about 5V, or the operating voltage of the microprocessor. This signal is provided to a converter 506 which, in one embodiment, may consist of a transistor and a resistor (e.g., transistor 404 and resistor 406). The resulting signal may then be encoded as signal 508 having a peak-to-peak voltage of approximately 1 volt on top of the original voltage already on the signaling wires (e.g., 24V). When the receiver 510 receives the signal 508, the encoded signal may be retrieved from the signaling wires after passing a capacitor 512, resulting in a signal having an amplitude of V, as shown in graph 513 of FIG. 5. An operational amplifier 514 may then be used to amplify the retrieved signal by approximately 10 times, or to a voltage of 10V, as shown in graph 515.

The amplified signal depicted in graph 515 may then be converted to a pulse signal by another operational amplifier 516 having an amplitude that is suitable for processing by the microprocessor 518 to decode the signal. Once the signal is decoded, the receiver 510 may perform additional operations in accordance with the received signal.

In one embodiment, two types of communication between a garage door operator and an associated wall button are possible. Namely, commands issued by a user from the wall button to the garage door operator, and garage door operator status information from the garage door operator to be displayed on the wall button. These communications can either be single- or bi-directional. In order to communicate between these two devices, a specific communication protocol is needed. In one embodiment, the communication protocol includes coded messages that are sent and received over the traditional signaling wires that connect garage door operators to their wall buttons.

Figure 6:
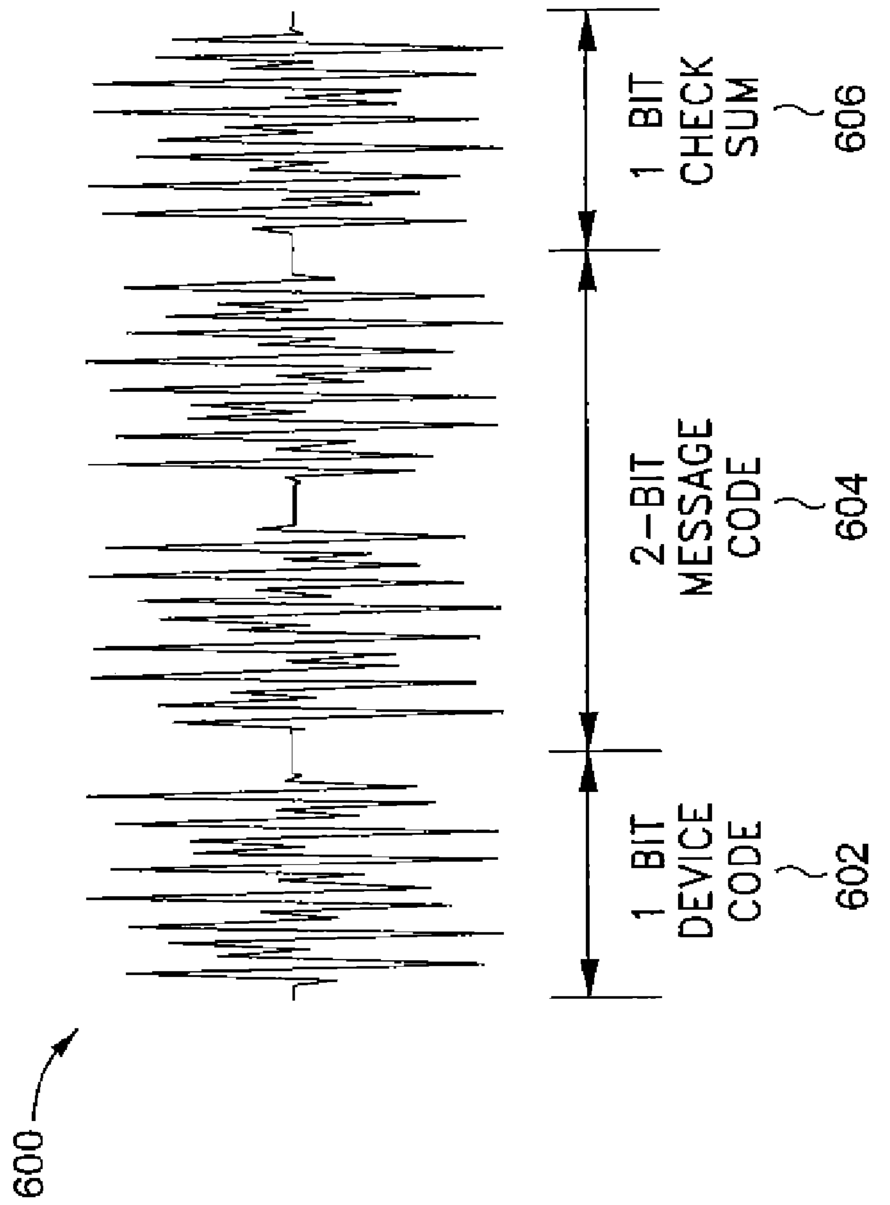
FIG. 6 is a DTMF signal pattern in accordance with one embodiment of the invention.

As mentioned, an encoded message may consist of up to 64 bits, with a typical message including a sync bit, multiple bits of device code, multiple bits of message code and multiple bits of a checksum. To that end, FIG. 6 illustrates a bit pattern 600 with 4 bits, consistent with the principles of one embodiment of the invention. In this embodiment, a DTMF signal with a 1-bit device code 602 may be sent. An optional sync bit can be sent at the beginning as a "wake up" signal for the receiver. In one embodiment the device code 602 is a unique code identifying each device that is to communicate with the receiving device. For example, there could be multiple devices connected to a garage door operator. In order to determine which connected device has generated the message, a unique device code 602 may be assign to each connected device. In another embodiment, it may not be necessary to identify the device that generated the message. In this case, the bit pattern of FIG. 6 may omit the device code 602 portion.

Continuing to refer to FIG. 6, following the device code (if any) is the message code 604, which in this embodiment is a 2-bit code representing the actual command or information being sent. In one embodiment, the message code 604 may be a command from a connected wall button to the garage door operator, or it may be information sent from a garage door operator that is to be displayed on the connected wall button. It should be appreciated that the encoded message can be in the format of a super-imposed signal, a PWM signal or DTMF signal.

Table A below shows a list of possible message codes for a garage door operator system configured in accordance with the invention:

TABLE A

| Garage Door Operator Message Codes |
|---|
| AC Power On |
| Door Open |
| Door Closed |
| Door Position |
| Safety Infrared Sensor Blocked |
| Backup battery connected |
| Backup battery disconnected |
| Low battery for backup battery |
| Light On |
| Light Off |
| Light Intensity |
| Door is Opening |
| Door is Closing |
| Remote Controls Disabled |
| Remote Controls Enabled |
| Number of Operations |
| Operation Failure |
| Motor Failure |

TABLE A-continued

| Garage Door Operator Message Codes |
| --- |
| Safety Infrared Sensor Failure<br>Receiver Failure |

After a message code 604 has been sent, it may optionally be followed by one or more checksum bits. In the embodiment of FIG. 6, a 1-bit checksum 606 based on the device code and message code is calculated and sent. In one embodiment, the receiver side may also calculate this checksum and respond to the message only when the calculated checksum is equivalent to the received checksum 606. In one embodiment, an invalid checksum will result in the receiver not acting on the message code 604. In addition, the receiver may request that the signal be re-sent. In another embodiment, the message code 604 may be encrypted, scrambled or even employed in a rolling code technique to enhance security.

Figure 7:
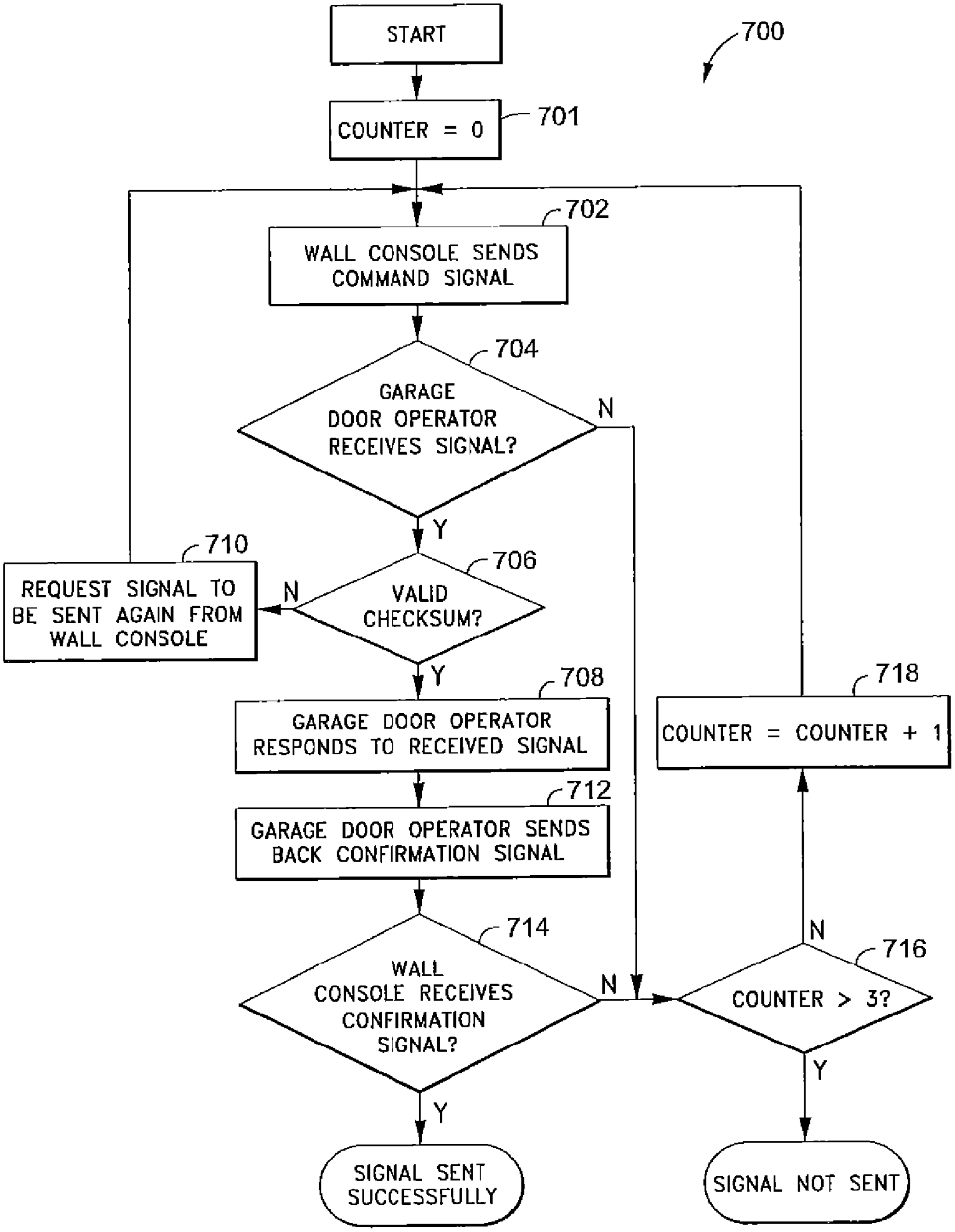
FIG. 7 is a flow diagram of one embodiment of a process for carrying out one or more aspect of the invention.

FIG. 7 is a flow diagram of one embodiment of a process 700 for signal sending from a transmitter (e.g., a wall button) to a receiver (e.g., garage door operator) based on a bi-directional protocol. In particular, process 700 begins at block 701 with a re-transmission counter being set to the value 0. At block 702, a signal transmission is initiated from a transmitter, such as a wall button. When this signal is received by the receiver side (e.g., the garage door operator) at block 704, the included checksum may be verified at block 706. If the checksum is valid, the command/information may be processed at block 708. Otherwise, the garage door operator may request that the wall button re-transmit the signal at block 710.

Once the command/information is processed or executed, the receiver (garage door opener) may send back a signal confirmation at block 712 to the transmitter (wall button) indicating the command/information was received. Once the confirmation signal is received by the wall button at block 714, the signal transmission sequence is completed. However, if the wall button cannot receive the confirmation signal, the wall button may retry to send the signal again, up to a predetermined number of times. In the embodiment of FIG. 7, this predetermined number of times is equal to 3. At block 716, a determination is made as to whether the signal has been sent the predetermined number of time. If so, the wall button will stop sending that signal. If, on the other hand, the predetermined number of re-transmission attempts has not been reach, then process 700 will continue to block 718 where the re-transmission counter is incremented by 1 and the signal re-sent (block 702). If the mentioned protocol is single directional, the garage door operator will not be able to send the confirmation signal.

In an event of a signal collision (e.g., where both wall button and garage door operator are sending signal at the same time), neither the wall button nor the garage door operator may receive a confirmation signal. In that case, the wall button may be assigned the higher priority to re-send the signal again. Therefore, if the wall button sends a signal but does not receive a confirmation signal from the garage door operator, it may immediately re-send the signal again. On the other hand, if the garage door operator does not receive a confirmation signal from the wall button, it will not re-send another signal immediately to avoid a possible collision of the re-sent signal. In one embodiment, the garage door operator may wait for a fixed period of time before re-sending.

Other than the standard wall button which allows users to operate the garage door operator, additional devices may be added in order to enhance the overall features of the garage door operator. Some devices function based on the signal received from the garage door operator, such as the radio frequency transmitter, which transmits the garage door condition to another wireless device. Other devices function to control the garage door operator, such as a voice activation garage door control, which can open or close a garage door based on a pre-recorded audio command (e.g., a human voice, hand clap, etc.).

Figure 8:
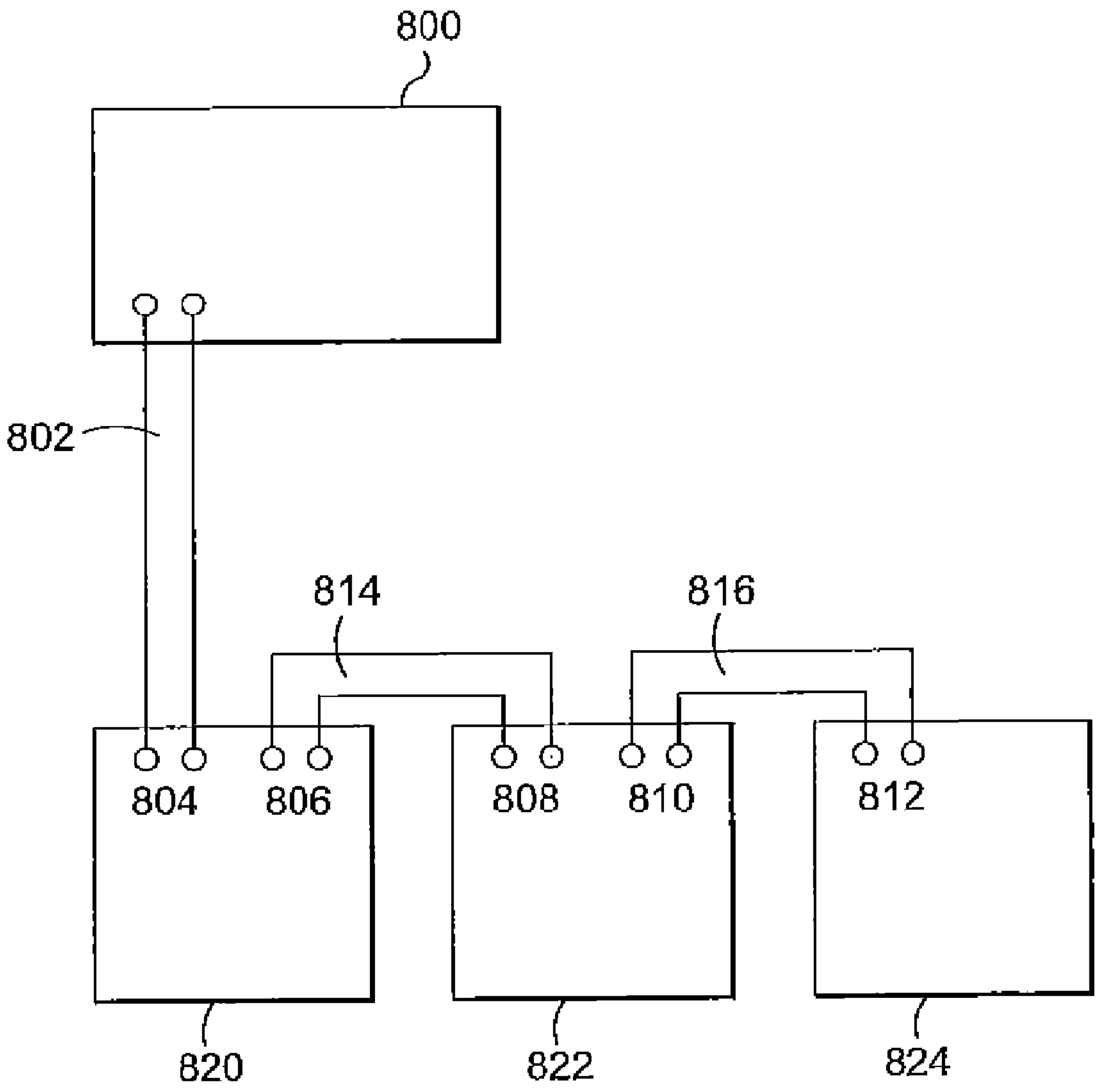
FIG. 8 is one embodiment of a simplified schematic of how devices can be connected in parallel to communicate in accordance with the principles of the invention.

In one embodiment of the invention, multiple devices may be connected in parallel, as shown in FIG. 8. Since all the devices are connected in parallel, a signal being sent by a garage door operator 800 will be sent to all connected devices through the signaling wires 802, 814 and 816. The first device 820 connected to the garage door operator 800 will receive the signal 802 through input terminals 804. This signal may then be forwarded as signal 814 using output terminals 806, which are coupled to the adjacent device's input terminals 808. Similarly, device 822 may then forward the message to device 824 as signal 816 using output terminals 810 coupled to input terminals 812. This parallel arrangement highlights the value of having a unique device code so that the source of a received signal can be readily identified.

In one embodiment, device 820 may be a wall button connected in parallel with device 822 and device 824. In one embodiment device 822 may be a radio frequency transmitter, while device 824 may be a carbon monoxide detector. As such, these add-on devices can communicate with and be used in conjunction with the garage door operator 800.

In one embodiment, the function of a radio frequency transmitter (e.g., device 822) is to send any garage door operator status information wirelessly to another wireless receiver. One application is a garage door monitor, which monitors the position of a garage door. The monitor may be used to send a wireless signal to a receiver that is located inside the house, for example, when the garage door is not in the fully closed position. The wireless receiver may then alert the homeowner of the opened garage door using any combination of visual and/or audio signals. It should further be noted that garage door operators are even capable of determining whether the garage door is just opened halfway, or whether it is fully opened. This type of position information can be sent from the garage door operator to the connected devices, which can in turn use this information to perform further operations.

Carbon monoxide (CO) detectors (e.g., device 824) can be used to detect the CO level inside the garage. When the CO exceeds a predetermined safety limit, the CO detector can signal for the GDO to open the garage door to improve ventilation until the CO level drops to within the safety limit. One the CO level drops to a safe level, the CO detector can signal again to the GDO to close the door.

Figure 9:
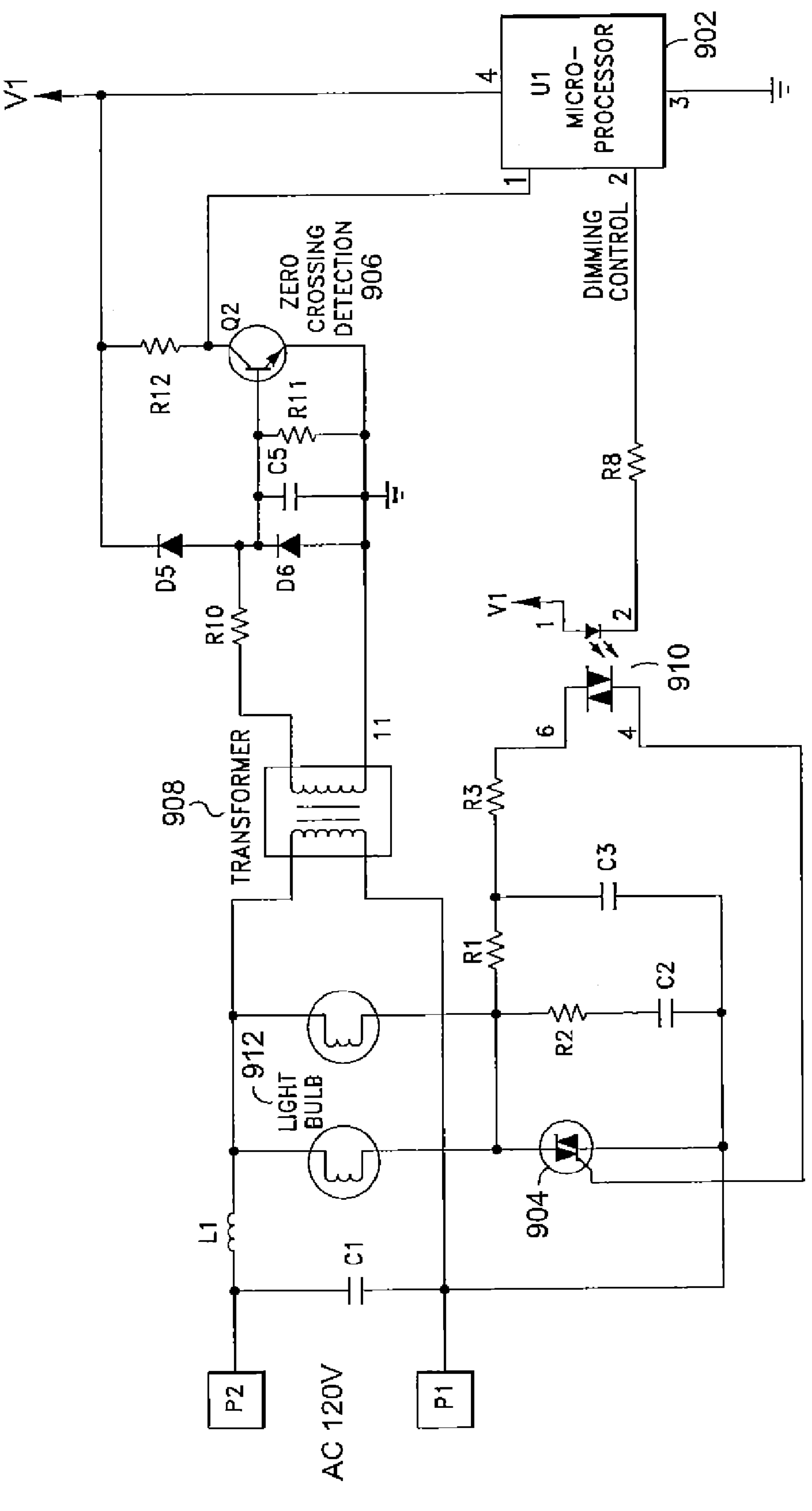
FIG. 9 is a schematic diagram of one embodiment of a control circuit for controlling one or more lights of a barrier operator.

As previously mentioned, another aspect of the invention is to provide an early indication of when the GDO light is about to turn off. Most garage door operators have one or light bulbs built-in to the units. When the garage door operator is activated, the light is activated and stays on for approximately 4.5 minutes. After 4.5 minutes, the light is turned off immediately with no warning to the user. By employing a Triode for Alternating Current (TRIAC) instead of the typical relay, the light can be dimmed or brightened slowly. To that end, FIG. 9 is a schematic of part of the circuitry of a garage door operator that controls the lighting. In particular, a microprocessor 902 is used as a timer to monitor the light-on period, which in one embodiment is approximately 4.5 minutes. When the garage door operator is activated, the microprocessor will send a signal to turn the light 912 on through a TRIAC 904. In order to control the light intensity, the microprocessor needs to activate the TRIAC 904 after the AC signal crosses zero voltage. A zero crossing detection circuit 906 may be used to detect when the AC signal crosses the zero voltage point. As described in more detail below with reference to FIGS. 10A-10C, depending on when the TRIAC 904 is activated after the signal crosses the zero voltage, the light intensity will be different.

Figure 10A:
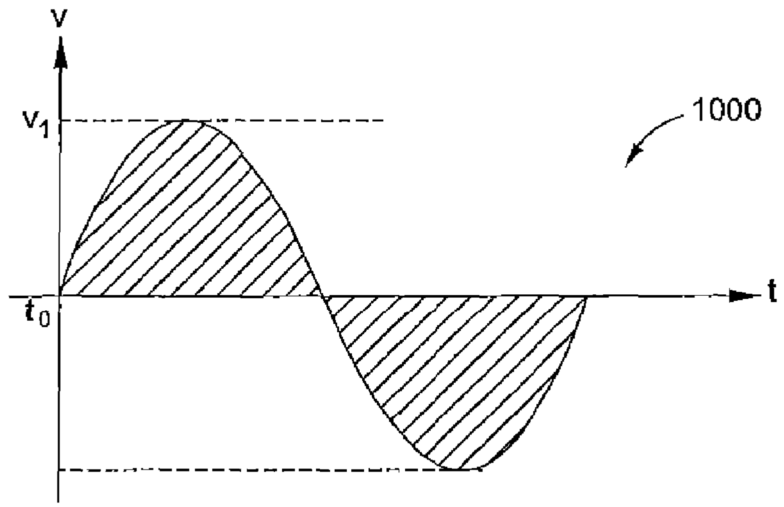
FIGS. 10A-10C illustrate voltage phase diagrams relating to the dimming feature of one embodiment of the invention.
Figure 10B:
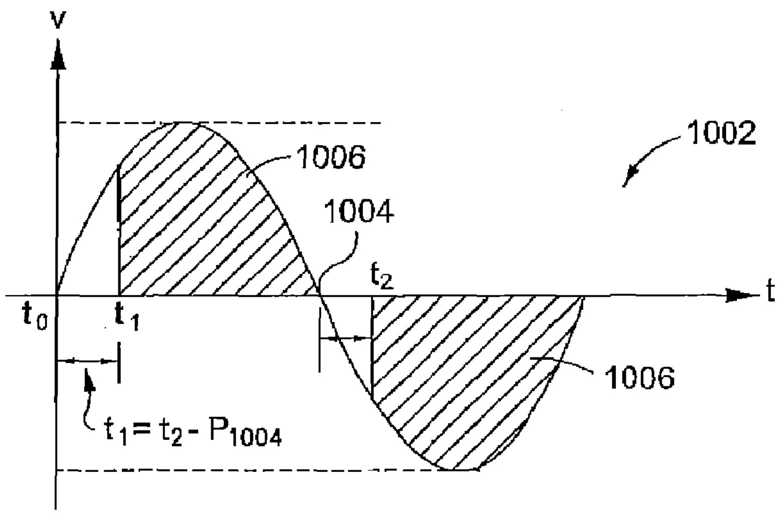
Figure 10C:
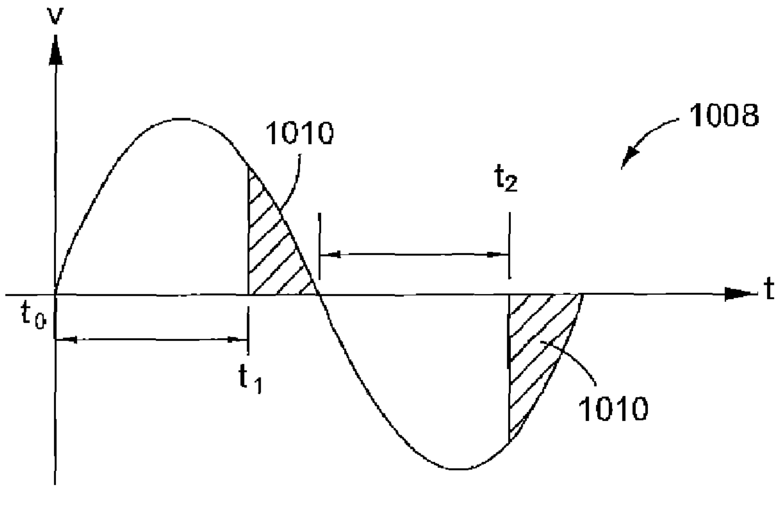

FIGS. 10A-10C show how the brightness of a GDO light may be changed by triggering the TRIAC 904 at different times. In particular, graph 1000 of FIG. 10 A depicts a typical AC voltage phase diagram having an amplitude of V1. If the depicted AC power source is supplied to a light bulb, the light bulb will be illuminated with full intensity (e.g., at the brightest level). In contrast, graph 1002 of FIG. 10B shows the same AC signal when controlled by the TRIAC 904. In order to reduce the brightness of the light bulb, the amount of AC power supplied to the light bulb must also be reduced. To that end, brightness may be reduced by controlling when to supply the AC power to the light bulb. In one embodiment, this is accomplished by triggering the TRIAC 904 at particular times. For example, at time $t_1$ in FIG. 10B, the TRIAC 904 is triggered, meaning that AC power begins being supplied to the associated light. Unlike in the typical embodiment of FIG. 10A, before $t_1$ the light receives no AC power, and as such remains off. In order to maintain the brightness at that specific level, after zero-crossing at point 1004, the TRIAC 904 may be triggered again at time $t_2$. Note that the duration from the first zero-crossing ($t_0$) to time $t_1$ is the same as the duration from second zero-crossing ($P_{1004}$) to time $t_2$. The area under the curve 1006 represents the total amount of AC power that supplies the light bulb. Thus, the smaller the area 1006, the dimmer the light will be.

FIG. 10C depicts another embodiment of a graph 1008 in which an AC signal to a light is being controlled by the TRIAC 904. In this embodiment, the amount of AC voltage being supplied is much less than in the embodiment of FIG. 10B, and as such, the brightness of the light will be less as compared to graph 1002. In particular, time $t_1$ in FIG. 10C is considerably later than in the embodiment of FIG. 10B, as is $t_2$. As such, the total area under the curve 1010 will be considerably less and the brightness of the light correspondingly lower.

The TRIAC 904 is triggered, meaning that AC power begins being supplied to the associated light. Unlike in the typical embodiment of FIG. 10A, before $t_1$ the light receives no AC power, and as such remains off. In order to maintain the brightness at that specific level, after zero-crossing at point 1004, the TRIAC 904 may be triggered again at time $t_2$. Note that the duration from the first zero-crossing ($t_0$) to time $t_1$ is the same as the duration from second zero-crossing ($P_{1004}$) to time $t_2$. The area under the curve 1006 represents the total amount of AC power that supplies the light bulb. Thus, the smaller the area 1006, the dimmer the light will be.

Since the microprocessor 902 is operating at a low voltage DC level, it may be desirable to have isolation between the AC lighting control circuitry and the microprocessor 902. In one embodiment, this isolation can be achieved using a transformer 908 for the zero crossing detection circuit, and an optical coupler 910 used for controlling the TRIAC 904. By controlling the brightness of the light 912, the microprocessor 902 can dim the brightness when the timer is about to expire, thereby alerting the user that the light will be turned off soon. In one embodiment this dimming may last for 20 seconds or more so that the user can decide whether to re-activate the light and extend the light-on period.

With the aforementioned communication protocol, add-on device capability and the dimmer feature of the garage door operator, a dimming lighting control device can be added. Namely, by connecting this dimming lighting control in parallel with other devices, a user can dim or brighten the light of the garage door operator similar to dimmers for in-house lighting.

While the preceding description has been directed to particular embodiments, it is understood that those skilled in the art may conceive modifications and/or variations to the specific embodiments described herein. For example, the invention is not intended to be limited to the garage door application, but is equally applicable to any barrier control system. Any such modifications or variations which fall within the purview of this description are intended to be included herein as well. It is understood that the description herein is intended to be illustrative only and is not intended to limit the scope of the invention.

What is claimed is:

1. A barrier operator system comprising:

a barrier operator including a motor drive unit configured to open and close a barrier, the barrier operator further including a barrier operator processor for encoding barrier information in accordance with a communication protocol; and a wall button unit comprising a wall button processor which is electrically connected to the barrier operator processor by a first wire, wherein the wall button processor receives encoded barrier information from the barrier operator processor over the first wire, and wherein the barrier operator is further to supply a predetermined direct current (DC) voltage to the wall button unit over said first wire, and wherein a second wire is electrically connected between the barrier operator and the wall button unit for carrying a returning current such that the first and second wires form a completed electrical circuit for powering the wall button unit.

2. The barrier operator system of claim 1, wherein the wall button processor is configured to decode the barrier information in accordance with the communication protocol.

3. The barrier operator system of claim 1, wherein the barrier information is superimposed onto said predetermined DC voltage of said first wire.

4. The barrier operator system of claim 1, wherein said communication protocol is a bi-directional protocol, and wherein the wall button processor is further configured to encode command information onto the returning circuit for the barrier operator processor in accordance with the communication protocol.

5. The barrier operator system of claim 3, wherein said communication protocol is a protocol selected from the list consisting of: Dual Tone Multi-Frequency (DTMF) and Pulse Width Modulation (PWM).

6. The barrier operator system of claim 1, further comprising an add-on module electrically connected to the wall button processor and configured to communicate with the wall button processor using said communication protocol.

7. The barrier operator system of claim 6, wherein said add-on module is selected from the list consisting of: a timer module, a voice activation module, a radio frequency transmitter, and a diagnostic status function.

8. The barrier operator system of claim 1, wherein said barrier operator further includes a light and a light dimmer circuit configured to control an amount of power supplied to said light, wherein said dimmer circuit is further configured to adjust said amount of power to dim the light after the light has been on for a predetermined period of time.

9. The barrier operator system of claim 8, wherein said dimmer circuit is configured to reduce the amount of power to said light over a predetermined dimming time.

10. The barrier operator system of claim 1, wherein said predetermined DC voltage is one of 12 volts and 24 volts.

11. The barrier operator system of claim 1, wherein the barrier information comprises status information representative of a status selected from the list consisting of: AC power on, door open, door closed, door position, safety infrared sensor blocked, backup battery connected, backup battery disconnected, low battery for backup battery, light on, light off, light intensity, door is opening, door is closing, remote controls disabled, remote controls enabled, number of operations, operation failure, motor failure, safety infrared sensor failure and receiver failure.

12. A wall button unit coupled to a barrier operator configured to open and close a barrier, the wall button unit comprising:

a first connector configured to receive a first wire, wherein the first wire electrically connects the wall button unit to the barrier operator, wherein the first wire carries a predetermined direct current (DC) voltage from the barrier operator to the wall button unit;

a second connector configured to receive a second wire, wherein the second wire carries a returning current such that said first and second wires form a completed electrical circuit for powering the wall button unit; and a wall button processor for decoding barrier information encoded in the predetermined DC voltage received on the first wire in accordance with a communication protocol, and wherein the wall button processor further receives the encoded barrier information from the barrier operation over said first wire via the first connector.

13. The wall button unit of claim 12, wherein the barrier information is encoded by the barrier operator in accordance with the communication protocol.

14. The wall button unit of claim 12, wherein the barrier information is superimposed onto said predetermined DC voltage of said first wire.

15. The wall button unit of claim 12, wherein said communication protocol is a bi-directional protocol, and wherein the wall button processor is further configured to encode command information onto the returning circuit for the barrier operator processor in accordance with the communication protocol.

16. The wall button unit of claim 15, wherein said communication protocol is a protocol selected from the list consisting of: Dual Tone Multi-Frequency (DTMF) and Pulse Width Modulation (PWM).

17. The wall button unit of claim 12, further comprising a third connector for receiving an add-on module configured to communicate with the wall button processor using said communication protocol.

18. The wall button unit of claim 17, wherein said add-on module is selected from the list consisting of: a timer module, a voice activation module, a radio frequency transmitter, and a diagnostic status function.

19. The wall button unit of claim 12, wherein said barrier operator is further configured with a light dimmer circuit configured to control an amount of power supplied to a light, wherein said dimmer circuit is further configured to adjust said amount of power to dim the light after the light has been on for a predetermined period of time.

20. The wall button unit of claim 19, wherein said dimmer circuit is configured to reduce the amount of power to said light over a predetermined dimming time.

21. The wall button unit of claim 12, wherein said predetermined DC voltage is one of 12 volts and 24 volts.

22. The wall button unit of claim 12, wherein the barrier information comprises status information representative of a status selected from the list consisting of: AC power on, door open, door closed, door position, safety infrared sensor blocked, backup battery connected, backup battery disconnected, low battery for backup battery, light on, light off, light intensity, door is opening, door is closing, remote controls disabled, remote controls enabled, number of operations, operation failure, motor failure, safety infrared sensor failure and receiver failure.

23. A method for operating a barrier operator comprising:

receiving a predetermined direct current (DC) voltage over a first wire from the barrier operator;

receiving, by a wall button processor, barrier information over the first wire from the barrier operator;

decoding, by the wall button processor, the barrier information in accordance with a communication protocol; and providing a returning current over a second wire to the barrier operator such that the first and second wires form a completed electrical circuit between the wall button unit and the barrier operator.

24. The method of claim 23, wherein receiving barrier information by the wall button processor comprises receiving barrier information by the wall button processor that is superimposed onto said predetermined DC voltage.

25. The method of claim 23, wherein said communication protocol is a bi-directional protocol, and wherein the method further comprises encoding command information onto the returning circuit for the barrier operator processor in accordance with the communication protocol.

26. The method of claim 25, wherein said communication protocol is a protocol selected from the list consisting of: Dual Tone Multi-Frequency (DTMF) and Pulse Width Modulation (PWM).

27. The method of claim 23, further comprising communicating with an ad-on module using said communication protocol.

28. The method of claim 27, wherein said add-on module is selected from the list consisting of: a timer module, a voice activation module, a radio frequency transmitter, and a diagnostic status function.

29. The method of claim 23, wherein said barrier operator further includes a light and a light dimmer circuit configured to control an amount of power supplied to said light, wherein said dimmer circuit is further configured to adjust said amount of power to dim the light after the light has been on for a predetermined period of time.

30. The method of claim 23, wherein the barrier information comprises status information representative of a status selected from the list consisting of: AC power on, door open, door closed, door position, safety infrared sensor blocked, backup battery connected, backup battery disconnected, low battery for backup battery, light on, light off, light intensity, door is opening, door is closing, remote controls disabled, remote controls enabled, number of operations, operation failure, motor failure, safety infrared sensor failure and receiver failure.

* * * * *

US007688014C1

(12) INTER PARTES REEXAMINATION CERTIFICATE (695th)

United States Patent

Tang et al.

(10) Number: US 7,688,014 C1

(45) Certificate Issued: Sep. 18, 2013

(54) SYSTEM AND METHOD FOR A MOVEABLE BARRIER OPERATOR

(75) Inventors: Ping Hung Tang, Fotan (HK); Gallen Ka Leung Tsui, Brampton (CA); Philip Y. W. Tsui, Brampton (CA)

(73) Assignee: Philip Y. W. Tsui, Fotan, Hong Kong (CN)

Reexamination Request:
No. 95/001,647, Jun. 8, 2011

Reexamination Certificate for:

| | |
|---|---|
| Patent No.: | **7,688,014** |
| Issued: | **Mar. 30, 2010** |
| Appl. No.: | **11/784,890** |
| Filed: | **Apr. 10, 2007** |

Related U.S. Application Data

(60) Provisional application No. 60/790,872, filed on Apr. 10, 2006.

(51) Int. Cl.
*H02P 3/00* (2006.01)

(52) U.S. Cl.
USPC ........ 318/466; 318/266; 318/282; 340/12.15; 340/13.37

(58) Field of Classification Search
None
See application file for complete search history.

(56) References Cited

To view the complete listing of prior art documents cited during the proceeding for Reexamination Control Number 95/001,647, please refer to the USPTO's public Patent Application Information Retrieval (PAIR) system under the Display References tab.

*Primary Examiner* — Minh Nguyen

(57) ABSTRACT

A communication protocol is employed between a movable barrier operator and an associated wall button using the traditional signaling wires connecting them. Implementing the communication protocol using the existing signaling wires also allows backward compatibility with the traditional push wall buttons that have a physical contact switch. In one embodiment, the communication protocol allows bi-directional communication between the moveable barrier operator and the wall button. The bi-directional embodiment of the protocol allows further communications, such as handshaking, signal confirmation and more advanced control between the wall unit and the barrier operator.

At the time of issuance and publication of this certificate, the patent remains subject to pending reissue application number 13/948,829 filed Jul. 23, 2013. The claim content of the patent may be subsequently revised if a reissue patent is issued from the reissue application.

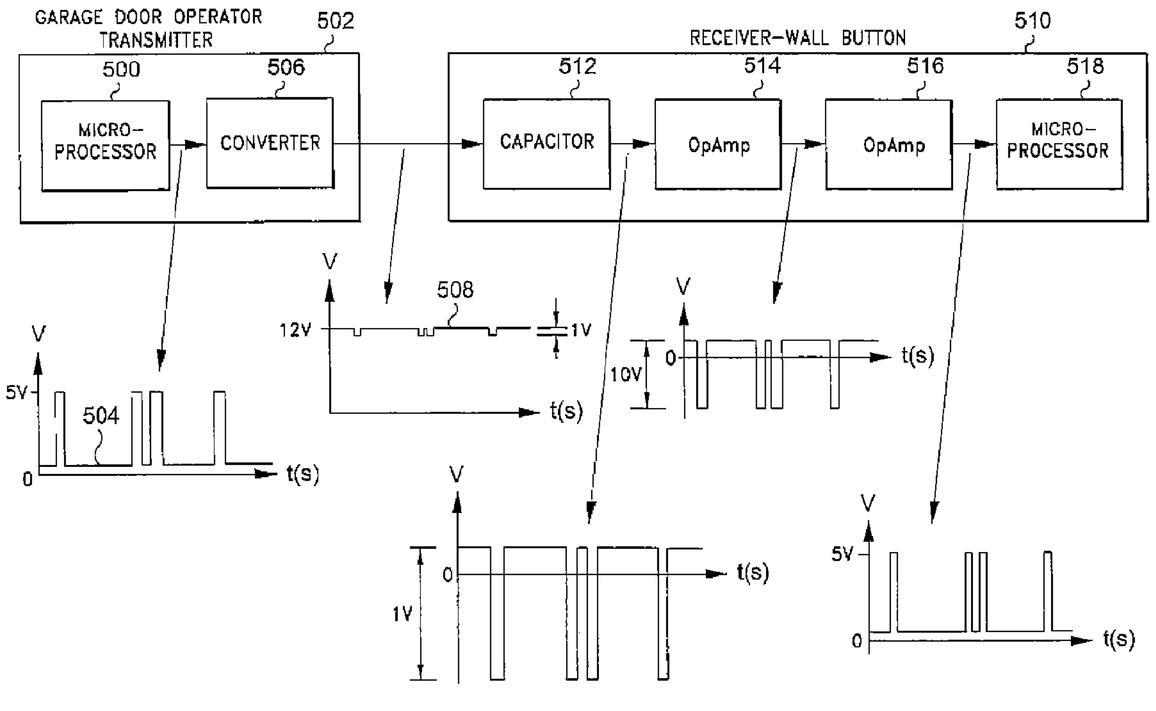

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-30 are cancelled.

* * * * *